April 1, 1947. H. C. DINMORE, JR., ET AL 2,418,166
APPARATUS AND PROCESS FOR THE HEAT TREATING OF COLLAPSIBLE
HOLLOW ARTICLES OF RUBBER AND THE LIKE
Filed Oct. 8, 1942
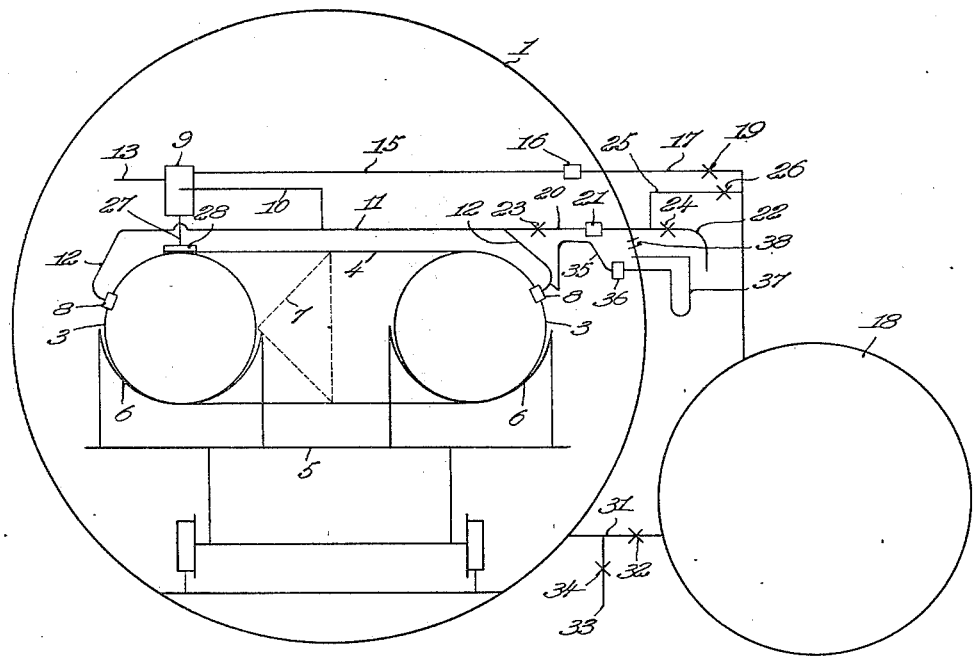

UNITED STATES PATENT OFFICE 2,418,166

APPARATUS AND PROCESS FOR THE HEAT-TREATING OF COLLAPSIBLE HOLLOW ARTICLES OF RUBBER AND THE LIKE

Harry C. Dinmore, Jr., Lowell, and Roland K. Fraser, Andover, Mass., assignors to Tyer Rubber Company, Andover, Mass., a corporation of Massachusetts Application October 8, 1942, Serial No. 461,262

14 Claims. (Cl. 18—6)

The present invention relates to an apparatus and a method or process for the heat treating of collapsible hollow articles of rubber and the like and is particularly adapted for the vulcanizing of such rubber articles of extreme size.

Heretofore it has been the practice when vulcanizing hollow rubber articles to confine them within a metallic form or mould of the shape or contour of the finished article, the external surface of the article being held in close contact with the internal surface of the mould in any one of several different ways. For example, with articles such as hot water bottles having a relatively large opening, it is customary to employ an internal form or core which, after vulcanization, is removed through the opening, the rubber of the article stretching sufficiently to permit such removal.

With other articles such as inner tubes for vehicle tires, the tube is inflated under sufficient air pressure to hold it in close contact with the inner surface of the mould.

In all of these prior methods of vulcanizing such hollow collapsible articles the article is confined and supported by means of a mould internally shaped to correspond to the external shape of the finished article, and where the article is of relatively small dimension like tubes, hot water bottles, etc., the use of such mould is not objectionable. Where, however, the article is of extreme size, as in the case of rubber boats and bridge pontoons now used by the armed forces of the United States, the bulk and weight of the moulds required and the expense involved in making the same prohibit their practical use. As a result, these structures are now commonly made by cementing together parts of the proper shape cut from rubberized canvas or duck or other textile material which has already been subjected to the vulcanizing process. Boats and pontoons constructed in this manner lack the tightness, strength and durability inherent in a structure which is first built up of unvulcanized material and subsequently is vulcanized under pressure into a practically integral, unitary structure.

It is the object of the present invention to provide an apparatus and a method of heat treatment and more especially of vulcanization under pressure whereby these unusually large hollow articles may be produced from unvulcanized stock in the desired shape or form without requiring the use of any confining or supporting mould.

To this end, the invention consists in inflating the article after it has been assembled from the unvulcanized material to expand it into hollow form more or less approximating its desired shape, supporting the inflated article unconfinedly in a closed vulcanizing chamber, and thereafter subjecting it to vulcanizing heat and pressure, the internal pressure in the article being controlled and regulated so that it is maintained only slightly higher than the external pressure, thus preventing the rupturing of the article by excessive internal pressure during the process of vulcanization.

In the accompanying drawing is shown diagrammatically a construction and arrangement adapted for carrying out such process. Within the vulcanizer 1, which is of long cylindrical construction, is the article to be vulcanized, in this case a pontoon 3 in the shape of an elongated annulus or "doughnut," consisting of an endless circular tube of two or more feet in diameter, with a floor 4 of rubberized canvas or duck closing the opening through the pontoon on one face. The pontoon is moved into and out of the vulcanizer on a car 5, on which it is supported in a cradle or sling 6 of canvas.

In order to prevent complete collapse of the pontoon from a single hole or leak, it is divided internally into a number of separate sections or compartments by means of bulkheads or partitions. These are of conical form as shown in dotted outline at 7 to permit the collapsing or flattening of the pontoon when deflated. Each compartment is provided with an air valve 8 for purposes of inflation and deflation.

Air is supplied to and withdrawn from the pontoon when it is within the closed vulcanizer and during the vulcanizing process through a suitable 3-way control valve 9 normally mounted upon the car, directly above the pontoon. One port of this valve is normally connected through pipe 10 with the manifold 11, fixed upon the car and carrying flexible connections 12, one for each of the air valves of the pontoon compartments. Each connection is provided at its end with a coupling for an air valve which is constructed to close the end of the connection when the latter is not coupled to an air valve. Only two of these flexible connections are illustrated in the drawing, but ordinarily the pontoon will have from six to eight compartments and the manifold will have a corresponding number of flexible connections.

Another of the ports of the control valve 9 is provided with an exhaust pipe 13 discharging into the vulcanizing chamber.

The third port of the control valve is normally connected with the pontoon compressed air supply pipe 15, coupled at 16 to the end of the fixed compressed air supply pipe 17 extending through the wall of the vulcanizer. Pipe 17 connects with the compressed air tank 18 and is provided with a manually-controlled valve 19.

Connected with the manifold 11 is the blowdown pipe 20, coupled at 21 to the external exhaust pipe 22 with control valves 23 on pipe 20, and 24 on pipe 22. This arrangement of blowdown pipes 20—22 and valves 23—24 is to facilitate and speed up the relieving of the pontoon of its internal pressure when the vulcanizer is blown down after the vulcanization process is terminated, as will be hereinafter more fully explained.

Connected into the external exhaust pipe 22 between the vulcanizer and the valve 24 is the branch compressed air pipe 25 controlled by the hand valve 26. This branch compressed air supply pipe is for the purpose of supplying compressed air directly to the manifold 11 and thence to the pontoons if for any reason the valve 9 fails to operate.

The construction of the control valve 9 is such that in one position of its mechanism compressed air will be supplied from the pipe 15 through the valve to the manifold 11 and thence through the flexible connections 12 to each of the compartments of the pontoon. In another position of the valve mechanism, the exhaust pipe 13 will be connected through the valve to the manifold and through the connections 12 to the compartments to withdraw air therefrom and exhaust it into the vulcanizer. In intermediate position air is neither supplied to nor withdrawn from the pontoon.

The control valve is actuated by means of a vertically movable plunger 27, having at its lower end a shoe or plate 28 which rests upon the top surface of the pontoon, so that as the top falls or rises, compressed air will be supplied to or withdrawn from the pontoon. It has been found that best results are secured if the pontoon from the beginning to the end of the vulcanizing process is kept inflated only to such extent that while its side walls are well rounded out there is a distinct flattening on its top surface. With a pontoon having an air chamber 30 inches in diameter, the preferred degree of inflation gives a vertical diameter of approximately 27½ inches. This degree of inflation represents a differential or excess of internal pressure within the pontoon over the external pressure of one-half inch of water. Such a pressure is sufficient to maintain the pontoon in proper shape for vulcanizing, but is not enough to cause separation of the unvulcanized parts of the pontoon, where they are temporarily joined, usually with a vulcanizing cement.

With this degree of inflation in the unvulcanized pontoon, any increase in internal pressure will raise the top of the pontoon and with it the shoe and plunger of the valve, thereby opening the exhaust port and venting the pontoon into the vulcanizer until the excess of internal pressure is relieved and the pontoon resumes its original shape and position. Conversely, if the top of the pontoon falls with the shoe and plunger, additional compressed air is supplied by the valve to the pontoon to re-establish its original predetermined degree of inflation.

Heat can be supplied to the interior of the vulcanizer in the usual manner by means of suitably arranged steam heating coils, and proper vulcanizing pressure can be created by means of compressed air supplied to the interior of the vulcanizer through compressed air supply pipe 31, leading from the compressed air tank 18 and having the hand valve 32. At the end of the vulcanization the vulcanizer is blown down or exhausted through branch 33 with manually-controlled exhaust valve 34.

In order that the operator may be able to ascertain at a glance the relative pressure condition in pontoon and vulcanizer, there is provided the flexible pipe 35 from one of the connections 12 to the union 36 and thence through the shell of vulcanizer to one leg of a manometer U-gage 37. The other leg of the U-gage is connected to the interior space of the vulcanizer. Water is used in the U-gage for recording the small differential pressure (½ inch of water) between pressure inside the pontoon and the pressure in the vulcanizer. This U-gage is particularly useful in checking the operation of control valve 9 during the main part of the curing operation and also during the start of the cure when the pressure in the vulcanizer is being built up to 30 pounds and during the last part of the cure when the pressure in the pontoon and vulcanizer is being blown down. In case of failure of valve 9 to operate, the process can be controlled by watching U-gage 37 and manipulating valves 24 and 26, valve 26 being used to put compressed air into pontoon and valve 24 to bleed air out.

In practicing the process, the assembled unvulcanized pontoon is inflated to the proper degree and is placed upon the sling or support on the car which is then positioned outside the vulcanizer. The flexible connections 12 from the manifold 11 fixed on the car are then connected to the air valves 8 in the pontoon sections or compartments, the manifold valve 23 at this time remaining closed. The control valve 9, which has been removed to facilitate the loading of the pontoon on the car, is now replaced on the car and pipes 10 and 15 are connected to their respective ports of the valve. The car is now run into the vulcanizer and the unions 16, 21 and 36 are coupled, the valves 19 and 24 at this time being closed, as also are the vulcanizer control valves 32 and 34. These unions are located close to the vulcanizer door so that the operator can reach into the vulcanizer to make the connections.

The manifold valve 23 is next opened and the vulcanizer door is closed. Air supply valve 19 is now opened to supply air to the pontoon and the steam heat for the vulcanizer turned on. The air supply valve 32 is now opened to supply compressed air to the vulcanizer and this supply is continued until the vulcanizer pressure reaches thirty pounds per square inch.

During this charging period, while the vulcanizer is being brought up to pressure, the operator watches the U-gage 37, regulating the rate of supply of air to the vulcanizer through the valve 32 so that it will not be faster than the air is supplied to the interior of the pontoon by control valve 9, and so cause sufficient compression of the pontoon to collapse and damage it. During this part of the process the operator manipulates the air supply valve 32 so as to maintain half an inch of water, plus pressure, in the pontoon. In case of accident to the U-gage or its connections which renders it inoperative, the operator can watch and control the shape of the pontoon by looking through the eye-piece or window 38 which is ordinarily provided in the wall of vulcanizers.

During this charging stage, and for a short time thereafter, the control valve will be supplying compressed air to the pontoon, but when the internal pressure reaches the predetermined excess of one-half inch of water the supply will be cut off and the valve will remain, for a time at least, in its neutral position.

Shortly the heat from the vulcanizer begins to penetrate the walls of the pontoon and the temperature of the air within begins to rise and with it the internal pressure. This slighly expands the pontoon, lifting the shoe and plunger of the valve and opening the connection into the vulcanizer. Such exhaust and venting continues as the temperature in the pontoon rises until the temperature in the pontoon reaches the same as that in the vulcanizer, and further increase in temperature and resulting increase of pressure within the pontoon ceases, the control valve then assuming its neutral position. Thereafter, the valve operates at intervals to correct for any slight change in the excess of pressure in the pontoon resulting from one cause or another, such for example as leakage from the vulcanizer, as at the door or around the piping, which causes a slight reduction in the pressure in the vulcanizer and the corresponding withdrawal of air from within the pontoon to maintain the desired differential.

If for any reason during the charging or the vulcanizing steps the operation of control valve 9 becomes faulty or ceases altogether, the operator, by watching the U-gage 37 and properly manipulating valves 24 and 26, may maintain the desired one-half inch of water, plus pressure, in the pontoon with respect to the interior of the vulcanizer.

In order to conserve heat and energy it is advisable to charge the tank 18 from the compressor just before it is drawn upon, the heat of compression in the air thus supplying some heat to the vulcanizer and to this extent saving steam.

When the vulcanization has been completed, which may be in approximately an hour and a half under ordinary conditions, the compressed air valve 19 is closed and exhaust or blow-down valves 34 for the vulcanizer and 24 for the pontoon are opened. Here again, the observer watches the U-gage, partially closing the vulcanizer exhaust valve 34 if he observes evidence of any substantial increase of excess pressure in the pontoon which might cause damage or even rupture. By partially closing the vulcanizer exhaust valve the proper differential can be quickly restored.

It is at this time that the advantage of the pipes 20 and 22 and valve 24 is apparent, as the pontoon may thereby exhaust directly from the manifold 11 into the open air at atmospheric pressure instead of being obliged to discharge all its air through the relatively small passage of control valve 9 against the substantial pressure then existing in the vulcanizer.

As soon as the vulcanizer reaches atmospheric pressure and the pontoon one-half inch of water in excess thereof, the vulcanizer door is opened, and the couplings 16, 21 and 36, which are located just within the door, are disconnected. The car is then withdrawn from the vulcanizer, the flexible connections 12 disconnected from the air valves 8 in the pontoon compartments, the pipes 10 and 15 disconnected from the control valve 9 and the latter removed, and the vulcanized pontoon removed from its supporting sling 6.

While the process has been described herein as a vulcanization of a rubber bridge pontoon with atmospheric air supplied to the interior of such pontoon and the interior of the vulcanizer to create the desired internal and external pressures, it is to be understood that the invention in its broader aspects is not limited to this particular article or heat treatment or to the use of air only, but covers in its broader aspects the application of heat to any closed hollow article supplied with or containing any gaseous material, with a control of such gaseous contents to prevent the development of excessive internal pressure due to the expansion of the gas by the heat during the treatment of the article, within the language and scope of the claims.

Nor is the present invention limited to use with the specific apparatus herein shown and described or to any particular form or arrangement, but may be practised with many different forms and arrangements of apparatus and entirely by manual control.

Having thus described the invention, what is claimed is:

1. A method of heat treating collapsible hollow articles of rubber and the like which consists in inflating the article by the introduction of gas, supporting the article unconfinedly, applying heat and external gaseous pressure to the article while so supported and inflated, and introducing additional gas into the article to increase the internal pressure as the external pressure increases to maintain the article properly inflated.

2. A method of heat treating collapsible hollow articles of rubber and the like which comprises a plurality of wall sections temporarily united by vulcanizable cement which consists in inflating the article by the introduction of gas, supporting the article unconfinedly, applying heat and external gaseous pressure to the article while so supported and inflated, and introducing additional gas into the article when its internal pressure falls appreciably below the external pressure thereon to keep the article properly inflated, and withdrawing gas from the article when its internal pressure materially exceeds the external pressure thereon to avoid the forcing apart of the wall sections by the excessive pressure during the vulcanizing operation.

3. A method of heat treating collapsible hollow articles of rubber and the like which consists in inflating the article by the introduction of gas, supporting the article unconfinedly in a closed heating space, applying heat and compressed gas to the space, and exhausting gas from the article into the space when the pressure within the article during such application materially exceeds that in the space to reduce the differential between the internal and external pressures on the article.

4. A method of heat treating collapsible hollow articles of rubber and the like which consists in inflating the article by the introduction of gas, supporting the article unconfinedly in a closed heating space, applying heat and compressed gas to the space, exhausting gas from the article into the space when the pressure within the article during such application materially exceeds that in the space, and exhausting both the closed space and the article into the open air when the heat treatment has been completed.

5. A method of heat treating collapsible hollow articles of rubber and the like which consists in inflating the article by the introduction of gas, supporting the article unconfinedly in a closed heating space, applying heat and compressed gas to the space, introducing additional gas into the article when its internal pressure falls appreciably below the external pressure thereon, exhausting both the closed space and the article directly into the open air when the heat treatment has been completed, and regulating the relative rates of exhaust from the space and the article to maintain a low pressure differential between the internal and the external pressures on the article.

6. A method of heat treating collapsible hollow articles of rubber and the like which consists in inflating the article by the introduction of gas, supporting the article unconfinedly in a closed heating space, applying heat and pressure to the exterior of the article while it is so inflated, and regulating the relative internal and external gaseous pressures on the article by the introduction of additional gas into, and the withdrawal of excess gas from, the article to maintain sufficient pressure differential to keep the article properly inflated while avoiding liability of damage by excessive internal pressure.

7. A method of heat treating collapsible hollow articles of rubber and the like which consists in inflating the article by the introduction of gas, supporting the article unconfinedly in a closed heating space, applying heat and pressure to the exterior of the article while it is so supported and inflated, and while it is so supported and inflated supplying and withdrawing gas to and from the interior of the article in accordance with variations in the shape of the same to maintain the desired internal pressure relative to the external pressure on the article.

8. A method of heat treating collapsible hollow articles of rubber and the like which consists in inflating the article by the introduction of gas, supporting the article unconfinedly in a closed heating space, and while it is so supported and inflated applying heat and pressure to the exterior of the article and regulating the supply and withdrawal of the gas to and from the interior of the article through downward and upward movements of the top surface of the article to maintain the desired internal pressure relative to the external pressure on the article.

9. A method of heat treating collapsible hollow articles of rubber and the like which consists in inflating the article by the introduction of gas, supporting the article unconfinedly, and while it is so supported and inflated applying heat and pressure to the exterior of the article supplying gas to the interior of the article when the top surface thereof falls below a predetermined position and withdrawing gas from the interior of the article when the top surface moves upward beyond a second predetermined position.

10. A method of vulcanizing rubber bridge pontoons, boats and the like which comprises a plurality of wall sections temporarily united by vulcanizable cement, the method consisting in inflating the pontoon with gas to approximately its final shape, supporting the unvulcanized pontoon unconfinedly in a closed vulcanizing chamber, subjecting it to vulcanizing heat and pressure within the chamber, and maintaining the internal pressure within the pontoon in excess of the external pressure thereon by an amount equal to approximately one-half inch of water column during the vulcanization by the introduction of additional gas into, and the withdrawal of excess gas from, the article to keep the article properly inflated and to avoid the forcing apart of the wall sections by excessive internal pressure during the vulcanizing operation.

11. A method of heat treating collapsible hollow articles of rubber and the like which comprises inflating the article by the introduction of gas, supporting the article unconfinedly, applying heat and external gaseous pressure to the article while so supported and inflated, and maintaining a predetermined differential of pressure between the inflating and external pressures by withdrawing gas from the interior of the article during the heat treatment should the external pressure drop relative to the internal pressure to thus prevent damaging the article.

12. Apparatus for use in vulcanizing hollow articles, comprising means for supplying a fluid medium under pressure to the inside of the article, means for applying a fluid vulcanizing medium under pressure about the article, and means responsive to variations in the pressure differential between the inside and the outside of the article for maintaining the pressure differential substantially constant during vulcanization.

13. Apparatus for use in vulcanizing hollow inflatable articles, comprising means for supplying an inflating medium under pressure to the article, means for applying a fluid vulcanizing medium under pressure about the articles, and means responsive to variations in the pressure differential between the inside and the outside of the article for maintaining the pressure differential substantially constant during vulcanization, said means including a fluid supply valve and a fluid release valve, and an element responsive to variations in the differential pressure for controlling said valves.

14. Apparatus for use in vulcanizing hollow inflatable articles, comprising means for supplying an inflating medium under pressure to the article, means for applying a fluid vulcanizing medium under pressure about the articles, and means responsive to variations in the shape of the article for maintaining the shape of the article substantially constant during vulcanization.

HARRY C. DINMORE, Jr.
ROLAND K. FRASER.

REFERENCES CITED

The following references are of record in the file of this patent:

UNITED STATES PATENTS

| Number | Name | Date |
| --- | --- | --- |
| 1,349,688 | Nichols | Aug. 17, 1920 |
| 2,014,010 | Wheatley | Sept. 10, 1935 |
| 1,039,323 | Roussillon | Sept. 24, 1912 |
| 2,226,768 | Harrison | Dec. 31, 1940 |